(12) United States Patent
Weaver

(10) Patent No.: US 6,338,316 B1
(45) Date of Patent: Jan. 15, 2002

(54) POULTRY DRAWER

(75) Inventor: Richard L. Weaver, Myerstown, PA (US)

(73) Assignee: Marilyn J. Enterprises Inc., Bradenton, FL (US)

( * ) Notice: Subject to any disclaimer, the term of this patent is extended or adjusted under 35 U.S.C. 154(b) by 0 days.

(21) Appl. No.: 09/383,964

(22) Filed: Aug. 26, 1999

(51) Int. Cl.[7] .................. A01K 31/07; B65D 21/032
(52) U.S. Cl. ................. 119/453; 119/489; 119/493; 119/496; 206/504
(58) Field of Search .................. 119/453, 487, 119/489, 490, 493, 496; D30/109; 206/504

(56) References Cited

U.S. PATENT DOCUMENTS

| | | | | |
|---|---|---|---|---|
| 3,604,590 A | * | 9/1971 | Jenkins | 220/84 |
| 3,754,676 A | * | 8/1973 | Box | 220/31 S |
| 3,930,467 A | * | 1/1976 | Fier, Jr. | 119/19 |
| 4,135,339 A | * | 1/1979 | Pawlitschek | 52/660 |
| 4,342,393 A | * | 8/1982 | Box | 206/504 |
| 4,998,967 A | * | 3/1991 | Box | 119/22 |
| 5,372,257 A | * | 12/1994 | Beauchamp et al. | 206/504 |

FOREIGN PATENT DOCUMENTS

| | | | | |
|---|---|---|---|---|
| GB | 2 129 672 B | | 11/1982 | A01K/29/00 |
| IT | 0867113 A2 | | 2/1998 | A01K/31/00 |

* cited by examiner

*Primary Examiner*—Charles T. Jordan
*Assistant Examiner*—Kimberly S Smith

(57) ABSTRACT

An integral one piece injection molded drawer for carrying live poultry on a road vehicle, having side walls and end walls, formed integrally together and meeting at radiused corners, and a floor formed integrally with the side walls and end walls, and intersecting ribs extending downwardly from the floor and extending from end to end and side to side of the drawer and defining generally rectangular spaces there between, and a plurality of intersecting bars located within the rectangular spaces, defining together an integral generally honeycomb floor structure the floor being shaped with a generally shallow upwardly convex profile, extending upwardly between the side and end walls.

6 Claims, 9 Drawing Sheets

FIG. 1

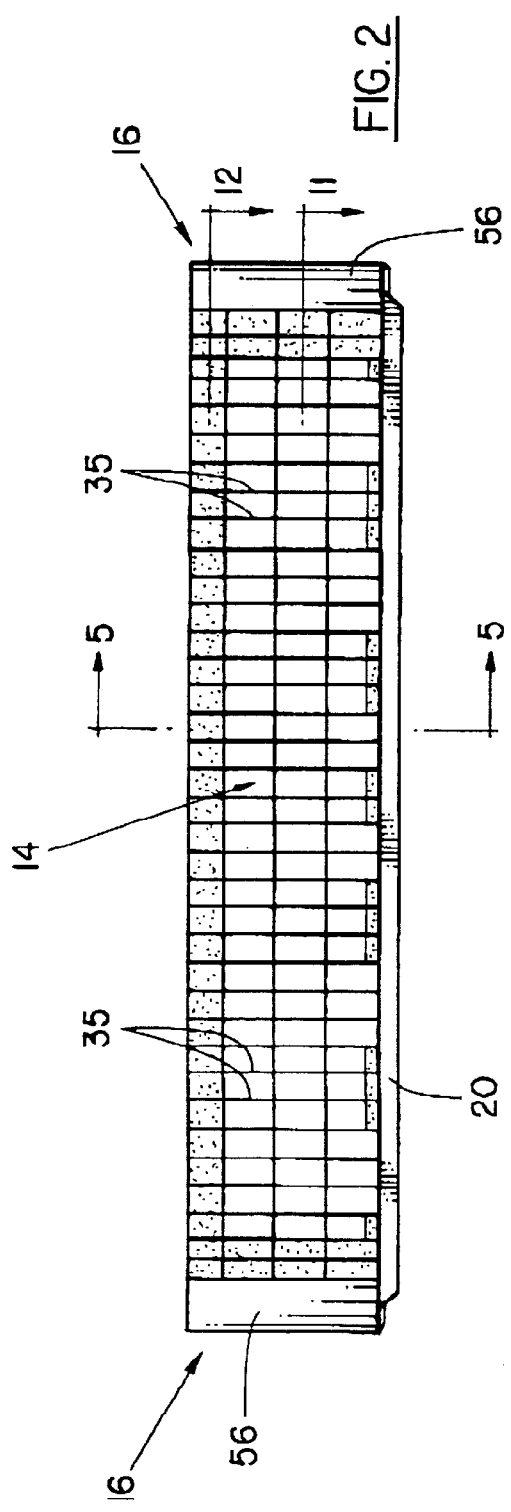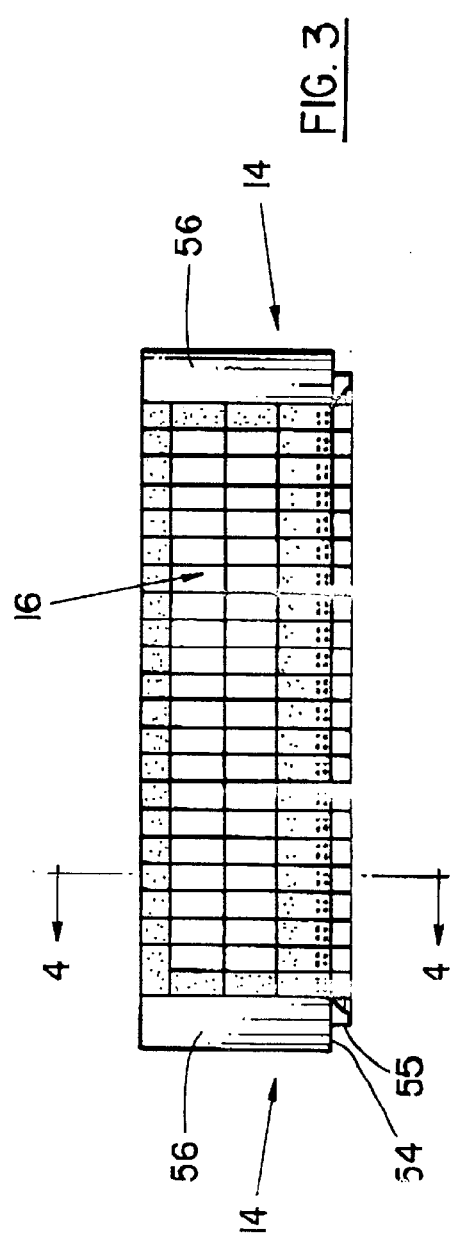

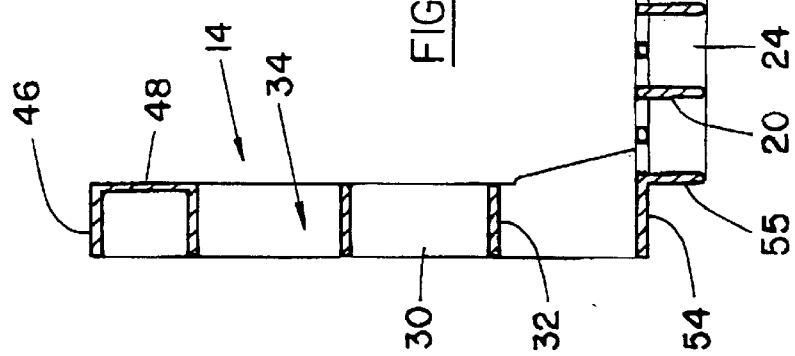
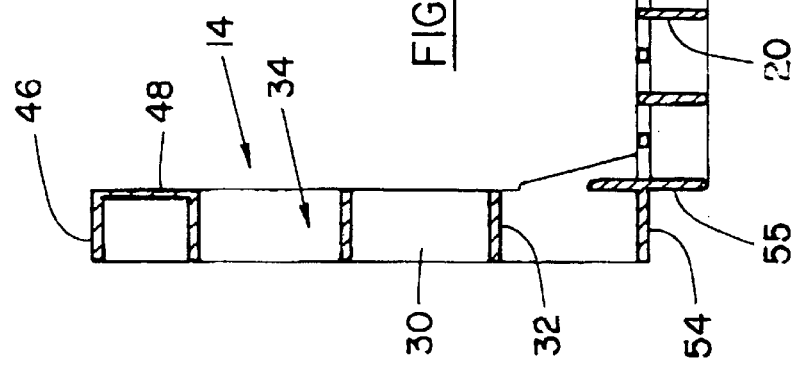
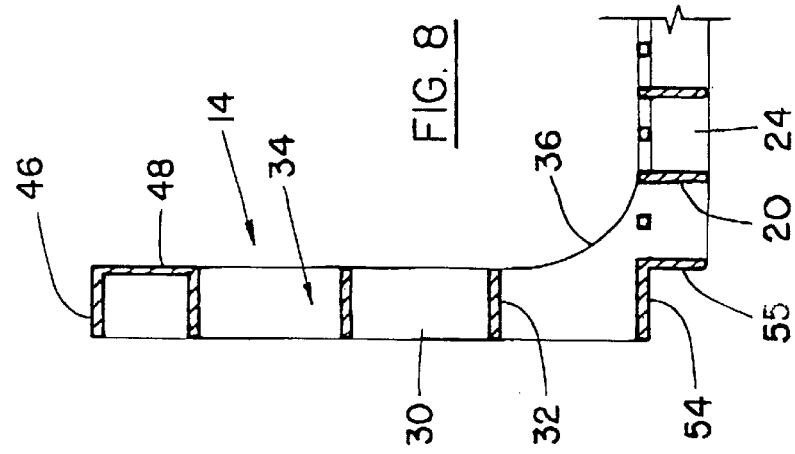

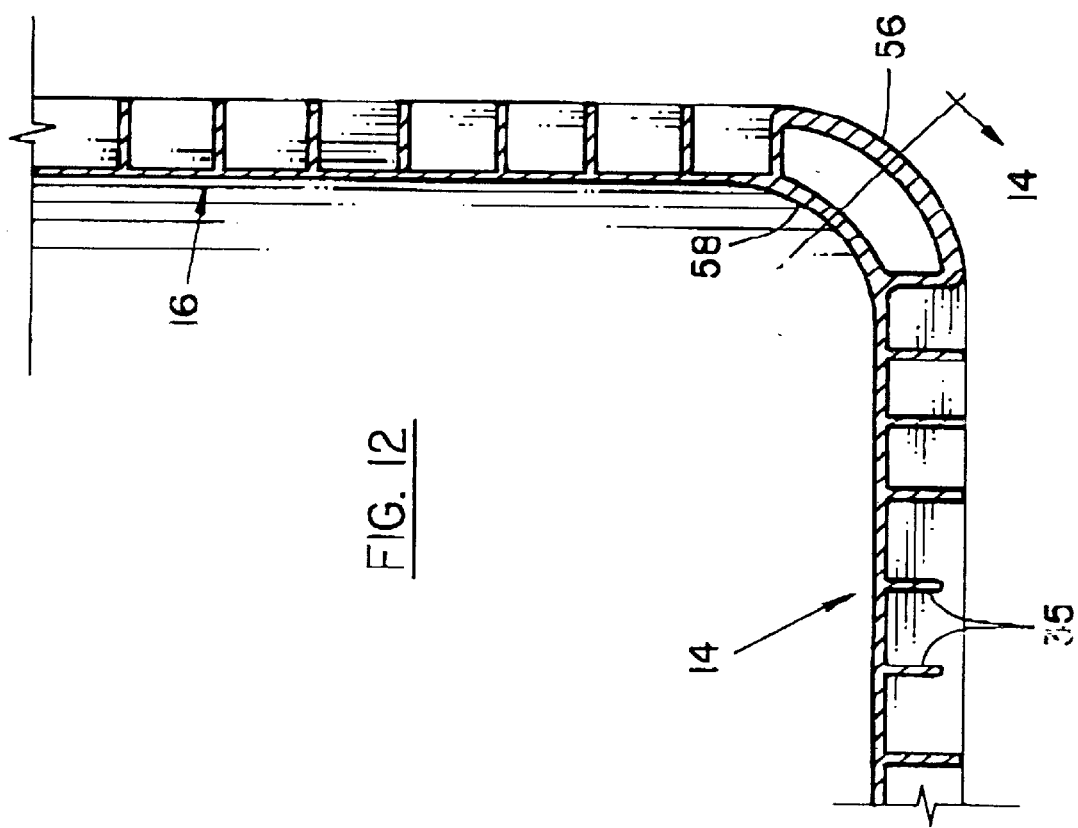
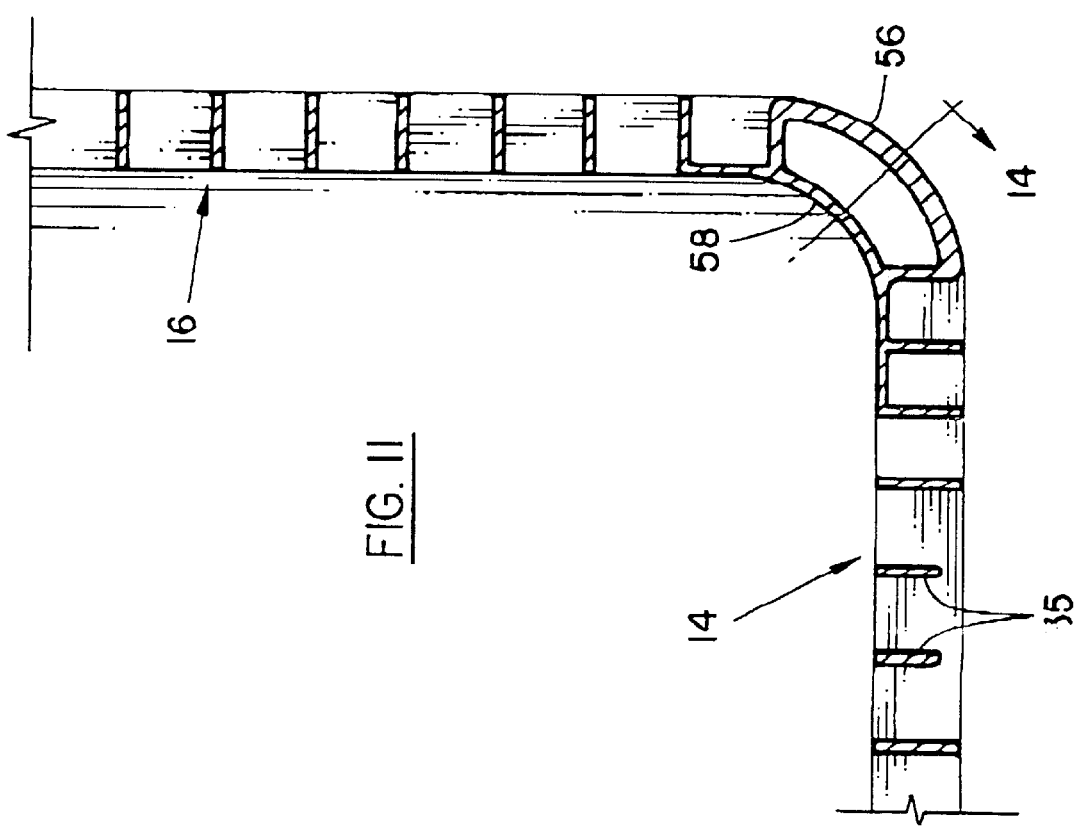

POULTRY DRAWER

FIELD OF THE INVENTION

The invention relates to an open topped drawer, used for transporting live poultry, in which the drawers are held in the drawers are held in racks, the drawers being stored one above the other, to permit the transportation of large numbers of live poultry, and in particular, to such a drawer which is manufactured by injection moulding thermoplastic techniques.

BACKGROUND OF THE INVENTION

Transportation of live poultry in vehicles and in lift trucks involves the placing of live poultry in open-topped rectangular drawers, and the drawers are then slid into racks on the vehicle for transportation. The drawers must be well ventilated to avoid harm to the live poultry during transportation. In addition, the drawers must be of a substantial size, for economical handling on transportation vehicles. The drawers must be engineered to support large quantities of live poultry, and to be readily adaptable to be cleaned between each usage and to be reused many times over. The drawers must also provide a secure footing for the poultry which may otherwise slide on the floor during transportation, and be injured. At the same time, such drawers should be so constructed that when installed and supported on their racks, they are securely held in position, and cannot easily become displaced during movement.

The handling of loaded poultry drawers is usually carried out by loading vehicles such as fork lift trucks or similar loading vehicles. Usually the transportation vehicle will have a large metal rack framework erected on the vehicle bed, and there will be spaces in the rack framework into which the drawers can be slid one at a time. In most cases, the drawers loaded with live poultry will be lifted one at a time by the fork lift truck operated by a driver who will then swing around and insert the drawer into an appropriate rack on the transportation vehicle.

During this process, the drawers are subjected to various impacts both as a result of an insertion of the forks or tines of the fork lift vehicle underneath the drawers to lift them up, and also as a result of the sliding of the drawers into their racks on the transportation vehicle. The drawers are of substantial size and carry a large number of live poultry. As a result, the total weight of each loaded drawer is considerable. Any impact on the thermoplastic material of which the drawer is made will cause substantial stresses due to the considerable mass of the loaded drawer.

In the past, such thermoplastic drawers as have been available, have been known to experience a variety of problems.

In the first place, the design and manufacture of the floor of the drawer, in the past, has often not been sufficient to withstand the weight of the large numbers of live poultry in the drawer, and as a result, the floor of the drawer tends to sag or bow downwardly in a more or less convex fashion. This downward flexing of the floor both sets up severe fatigue stresses in the plastic and also causes the drawer to be flexed out of shape so that it does not readily slide into its rack. It is well known that most thermoplastics have a relatively low fatigue life, and consequently any excessive fatigue stresses on the plastic will lead to early failure and this has, in fact, happened in the past.

The downward bowing of the floor of one drawer has tended to cause the floor of one drawer to interfere with the racks and even with the side walls of the next drawer beneath it and so on, so that in some cases considerable force has to be exerted on the drawer to force it into its rack and cause it to ride up over the obstruction caused by bowing of the floor.

Further problems have been encountered in the design of the side walls of the drawers. As the drawers are inserted into their racks, there is frequently a certain minor degree of misalignment between the side walls of the drawer and the sides of the rack. As a result, one of the side walls may impact on some portion of the rack frame and again such impacts when repeated over time will cause rapid failure of thermoplastic materials.

Failure or breakage of a drawer may cause large numbers of live poultry to be either lost or simply injured. For example, if the floor bows down then the live poultry will not be supported evenly on the floor of the drawer and will tend to slide down to the lowest point of the floor. This will cause overcrowding of certain areas in each drawer and some live poultry will become injured and as a result making them an unacceptable form. The same thing can happen if the floor is smooth so that the poultry cannot obtain a secure footing.

The cleansing of the drawers which must be carried out between each usage to keep the drawers sterile is an important factor in the design of drawers especially bearing in mind that they are manufactured out of thermoplastic materials. The manufacture of such materials permits the incorporation of numerous openings in the side walls and in the floor of the drawers to provide ventilation but at the same time such openings readily accumulate debris and must be capable of being thoroughly cleansed. In addition to all of these factors, the injection moulding of the drawers in a single piece of thermoplastic material sets up its own list of engineering problems all of which must to be addressed, together with the other problems enumerated above. Storage of drawers between use requires stacking of the drawers, and their design must facilitate this function. Various forms of such drawers and trays are illustrated in earlier patents, details of which are set out in the list of patents relating to this type of product but in spite of significant improvements represented in these earlier patents the actual products still exhibit some of the problems described above.

BRIEF SUMMARY OF THE INVENTION

With a view therefore to providing a drawer having a greater ability to satisfy the foregoing problems, the invention comprises an integral one piece injection moulded drawer suitable for carrying live poultry on a road vehicle, the drawer comprising side walls and end walls formed integrally together and meeting at corners, and a floor formed integrally with the side walls and end walls, and intersecting ribs extend downwardly from the said floor and extending from end to end and side to side of said drawer and defining generally rectangular spaces there between, and a plurality of intersecting bars located within said rectangular spaces, defining together an integral generally honeycomb floor structure, and wherein the floor is shaped with a generally shallow convexly curved dome-like profile, extending upwardly between said side and end walls, and said side walls being formed of intersecting ribs defining generally rectangular spaces there between, and said corners defining generally rounded corner formations.

More particularly the invention provides that the corners are formed of inner and outer radiused corner walls, the outer walls extending from the outer most periphery of the side wall and end wall ribs, and the inner corner walls extending integrally from the inner most edges of the ribs of the side and end walls. The invention further provides that the vertical ribs in the side walls, at spaced intervals, are joined to the transverse ribs in the floor by means of concave junction walls formed integrally therewith.

The invention further provides that the lengthwise ribs in the floor, and the bars at each end of the floor, are merged into integrally formed, generally curved junction walls, providing a curved junction wall between the floor and the end walls.

The invention further provides that the side walls and end walls at their upper extremities are provided with generally continuous side and end wall flanges, located in the generally horizontal plane, and including interior side and end wall reinforcement flanges, extending downwardly from said top wall flanges. The invention further provides that the end wall flanges terminate at a level below said side wall flanges thereby to define respective end wall notches at either end of said drawer.

The various features of novelty which characterize the invention are pointed out with more particularity in the claims annexed to and forming a part of this disclosure. For a better understanding of the invention, its operating advantages and specific objects attained by its use, reference should be made to the accompanying drawings and descriptive matter in which there are illustrated and described preferred embodiments of the invention.

IN THE DRAWINGS

FIG. 2 is a side elevational view of the drawer of FIG. 1;

FIG. 3 is an end elevational view of the drawer of FIG. 1;

FIG. 8 is a section along the line 8—8 of FIG. 1;

FIG. 9 is a section along the line of 9—9 of FIG. 1;

FIG. 10 is a section along the line of 10—10 of FIG. 2;

FIG. 11 is a section along the line of 11—11 of FIG. 3;

FIG. 12 is an enlarged lower plan view of a drawer looking upwardly;

DESCRIPTION OF A SPECIFIC EMBODIMENT

As already explained, it is desirable for various reasons that the trays shall be well ventilated. They must also be strong enough to withstand various shocks in loading and unloading and in transport, and during cleaning.

They must also be capable of carrying a substantial load of poultry, and in particular, to providing a flat floor with a suitable surface on which the poultry may stand securely during transportation, so as to avoid sliding, and/or crowding into a reduced space within the drawer.

Figure 1:
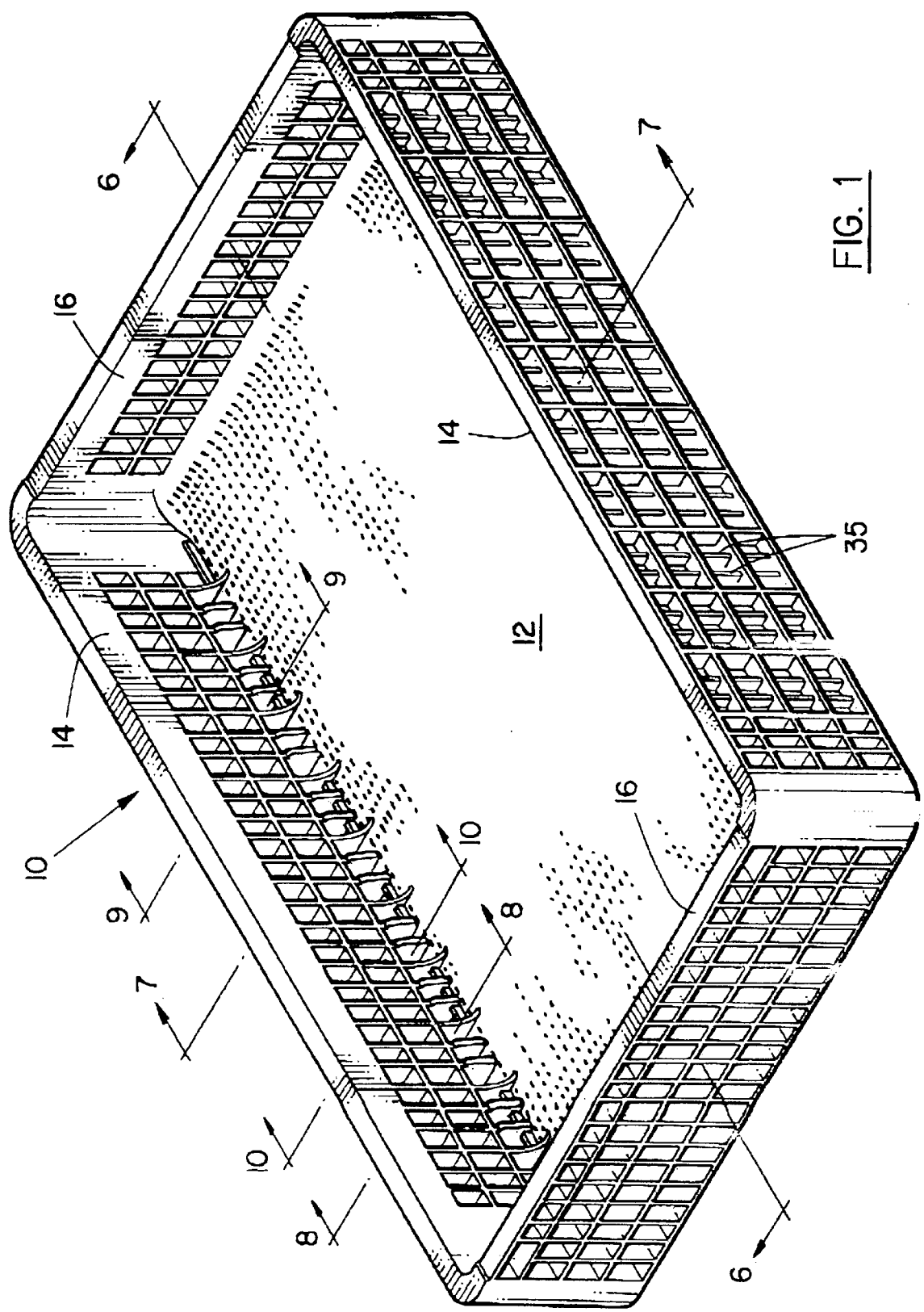
FIG. 1 is an upper perspective illustration of a poultry drawer illustrating the invention.
Figure 5:
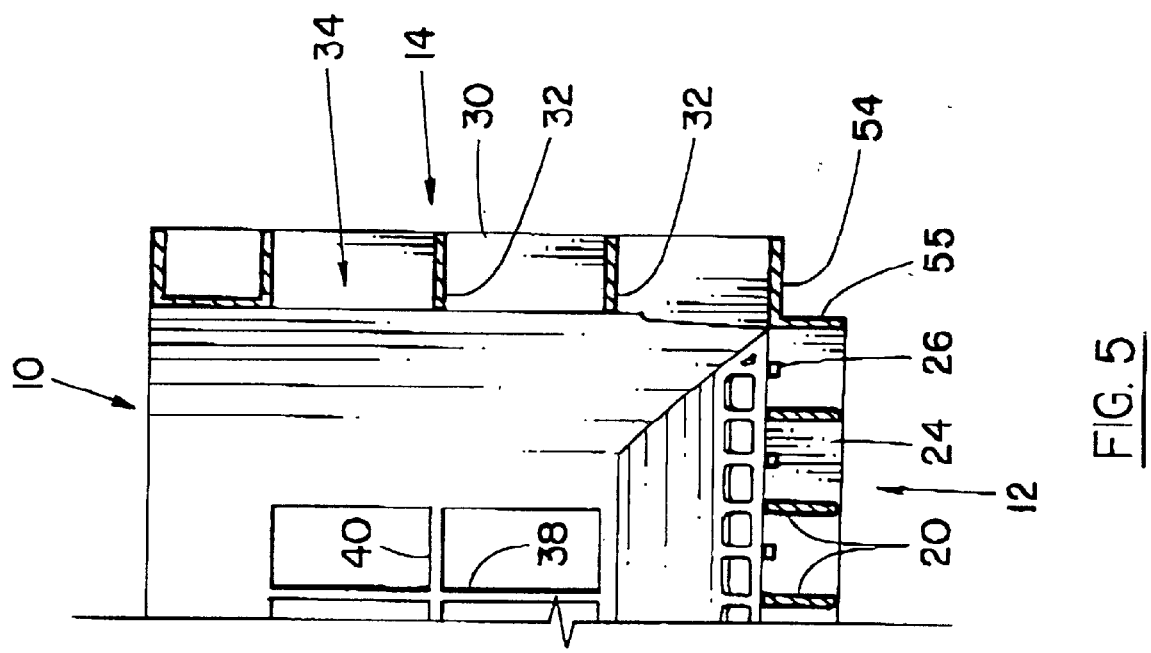
FIG. 5 is an enlarged section along the line 5—5 of FIG. 2.
Figure 4:
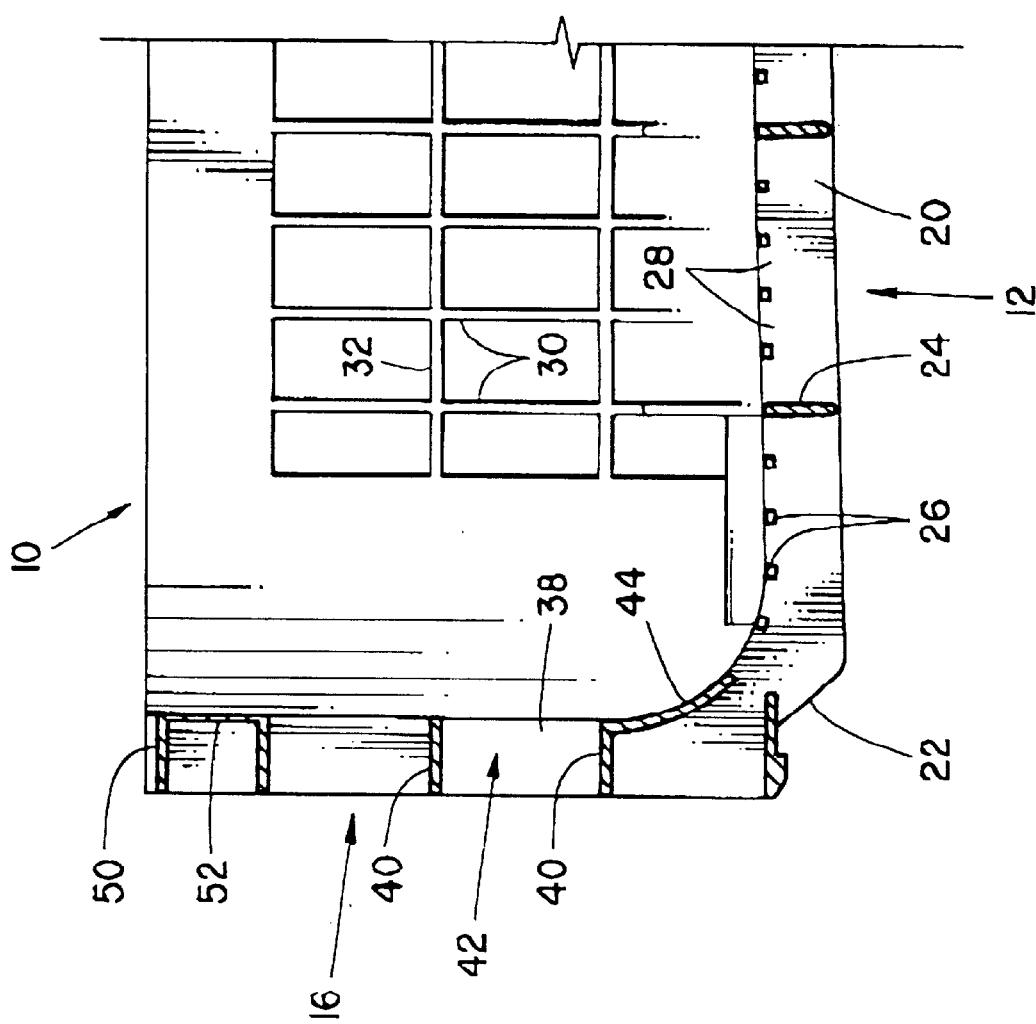
FIG. 4 is a partial section, partially cut away, along the line 4—4 of FIG. 3.

A drawer indicated generally as 10 (FIG. 1), illustrates the invention. It will be seen to comprise a generally rectangular shape defining a floor indicated as 12, side walls indicated as 14 and end walls indicated as 16. The top of the drawer is open. The entire drawer 10 is moulded in one complete piece by injection moulding of thermoplastic materials, so as to provide maximum strength and integrity.

In order to provide for full ventilation across the drawer, both the side walls, the end walls and the floor are all made in a form of honeycomb construction defining a large plurality of openings. This both reduces the weight of the entire drawer, and at the same time allows maximum cross flow of air for ventilation.

It also permits the entire structure to be strengthened and reinforced, in a manner to be described below.

Thus the floor 12 is seen to comprise a plurality of parallel spaced apart lengthwise ribs 20 (FIGS. 4, 5, 7, 8, 9), running substantially from one end wall to the other, and parallel to the side walls. The lengthwise ribs 20 are of substantial depth so as to provide maximum load bearing capacity for the floor.

At each end of the lengthwise ribs 20, generally sloping angled surfaces 22 (FIG. 4) are formed, for reasons to be described below.

Intersecting the lengthwise ribs 20, there are a plurality of transverse ribs 24, extending substantially from one side wall to the other. The transverse ribs 24 are, in this case, of the same depth on the lengthwise ribs 20, and cooperate in providing substantial load bearing capacity to the entire floor.

Between the lengthwise ribs 20 and the transverse ribs 24, there are rectangular spaces and in which there are provided a grid of cross bars 26. In this embodiment, although without limitation, the rectangular spaces between the lengthwise ribs 20 and transverse ribs 24, are elongated so that there is one central cross bar 26, and four transverse cross bars 26. The cross bars 26 define generally right angular cruciform intersections, and merge with respective lengthwise ribs 20 and transverse ribs 24 on their opposite ends. The cross bars 26 together with the lengthwise ribs 20 and transverse 24 define a large plurality of generally rectangular openings 28 (FIG. 12).

Figure 6:
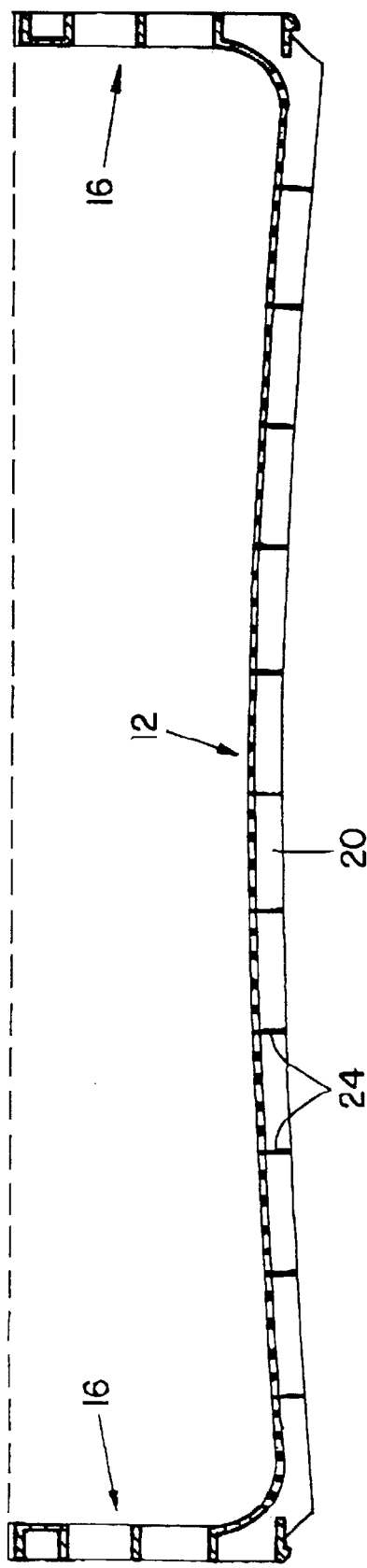
FIG. 6 is an enlarged section along the line 6—6 of FIG. 1.
Figure 7:
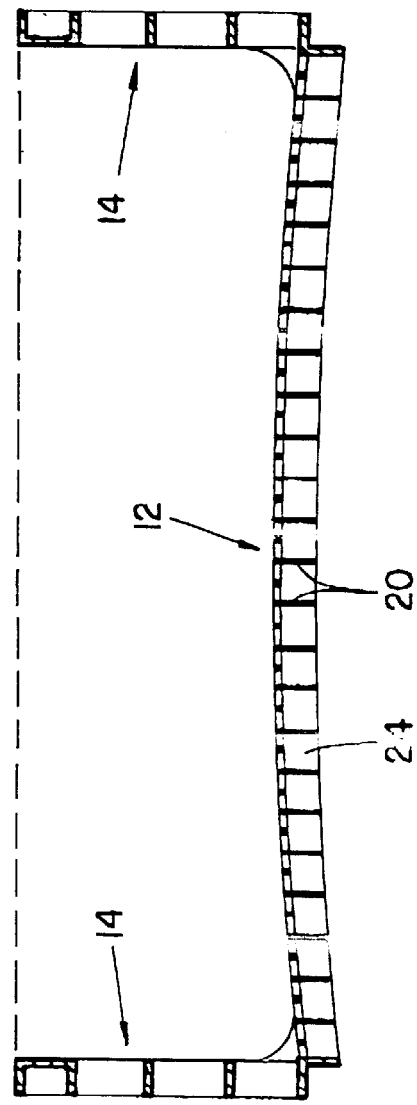
FIG. 7 is an enlarged section along the line 7—7 of FIG. 1.
Figure 13:
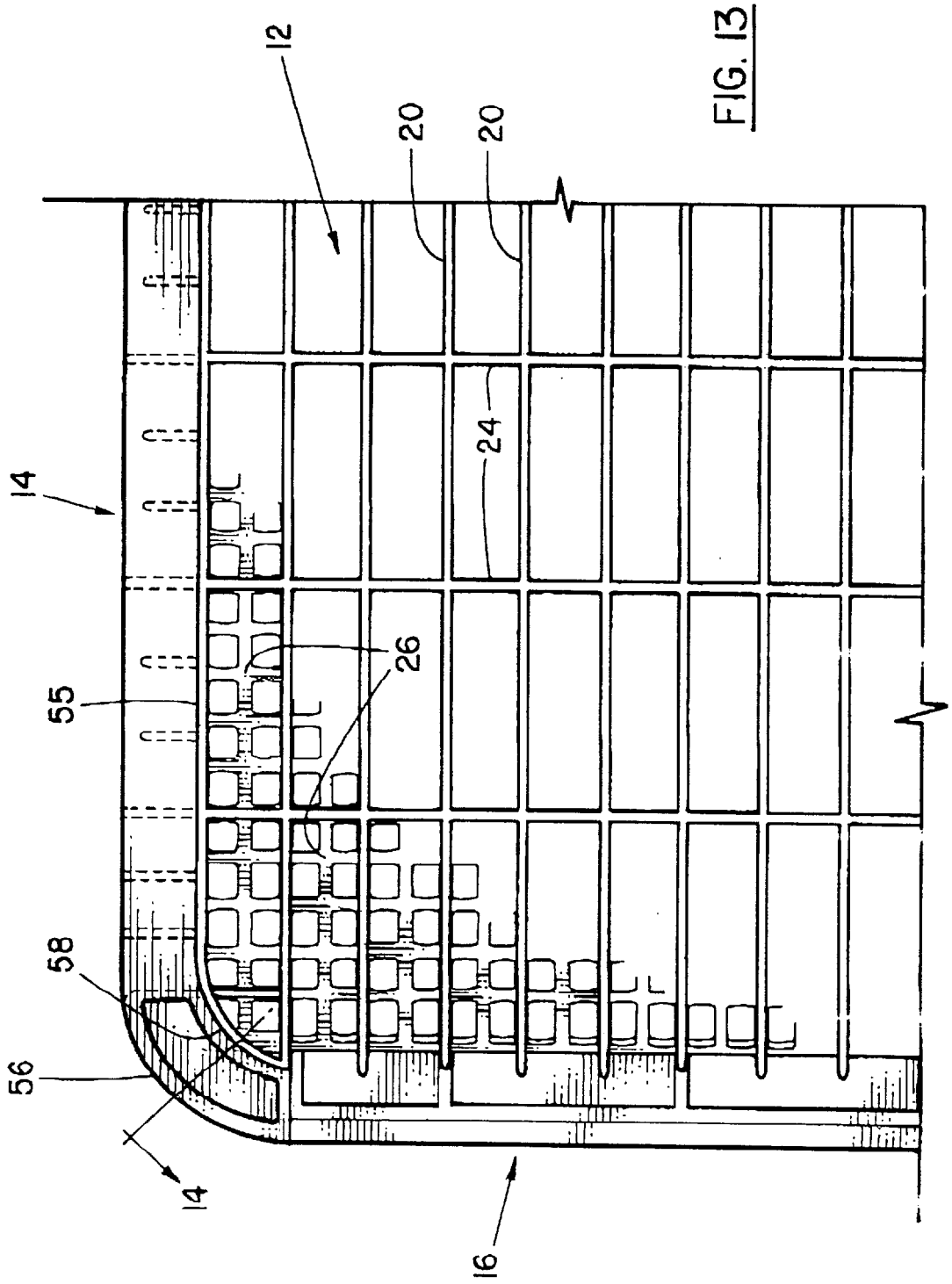
FIG. 13 is a section along the line of 13—13 of FIG. 12.

The lengthwise ribs 20 and the transverse ribs 24 define in section (FIG. 6 and 7) a generally gently convexly upwardly curved dome-like structure, which is contoured in a convex upward curve so that the centre of the floor is raised above the remainder of the floor in the form of a shallow dome. In this way, the load bearing capacity of the floor is greatly increased, and the stresses created by the load will be transmitted to the side walls and end walls, as the floor attempts to flatten out under a load of poultry. The upward convex shaping of the floor is convex both along the length of the lengthwise ribs 20 and also along the length of the transverse ribs 24, so that the centre of the floor is at the highest point in the drawer when it is unloaded.

This both effectively increases the service life of the drawer, and at the same time prevents downward bowing of the floor which might otherwise result from the weight of a load of poultry.

Each of the two side walls 14 (FIGS. 5, 7, 8, 9) will be seen to comprise a plurality of generally parallel spaced apart vertical ribs 30, intersected by a plurality of transverse generally horizontal ribs 32.

It will be appreciated that the use of the terms vertical and horizontal are purely by way of explanation and without any restriction or limitation on the invention. The modules and drawers may in fact be used in a somewhat tilted position in use, but the reference to vertical and horizontal is not intended to in any way restrict the scope of the invention to a drawer which is located in a horizontal plane or in any plane.

The vertical and horizontal ribs 30 and 32 together define a plurality of generally rectangular side wall openings 34, which effectively both reduce the weight of the entire drawer and at the same time permit maximum ventilation. Upright interior ribs 35 extend between horizontal ribs 32, within openings 34.

At spaced intervals along the length of the side walls 14, some of such vertical ribs are formed at their lower ends with concavely contoured fillets or curved junction walls 36 (FIG. 8). The curved junction walls 36 are aligned and merge both with the selected ones of the vertical ribs 30 and also selected ones of the transverse ribs 24. In this way the loading between the floor and the side walls is carried through the curved junction walls 36 in an effective and efficient manner.

The end walls 16 (FIG. 4) are also formed of a plurality of spaced apart vertical ribs 38, and a plurality of spaced horizontal ribs 40, which intersect vertical ribs 38. The vertical and horizontal ribs 38 and 40 define a plurality of end wall rectangular openings 42. The rectangular openings 42 assist in providing maximum strength as well as ventilation through and around the drawer and reduce weight.

The lower ends of the vertical ribs 38 in the end walls are formed with a generally concavely curved junction wall 44 merging with the lengthwise ribs 20 and cross bars 26. In this way the load between the lengthwise ribs 20 and the vertical ribs 38 is effectively transferred.

Around the upper extremity of the side walls 14 a horizontal planar wall strip 46 is formed and from the planar wall strip 46 an internal flange 48 extends downwardly for approximately the width of one of the rectangular side wall openings 34. In generally the same way, the end walls 16 are provided with top wall strips 50, and internal wall flanges 52, thereby providing for maximum structural integrity around the upper edges of the side walls and ends walls.

Figure 15:
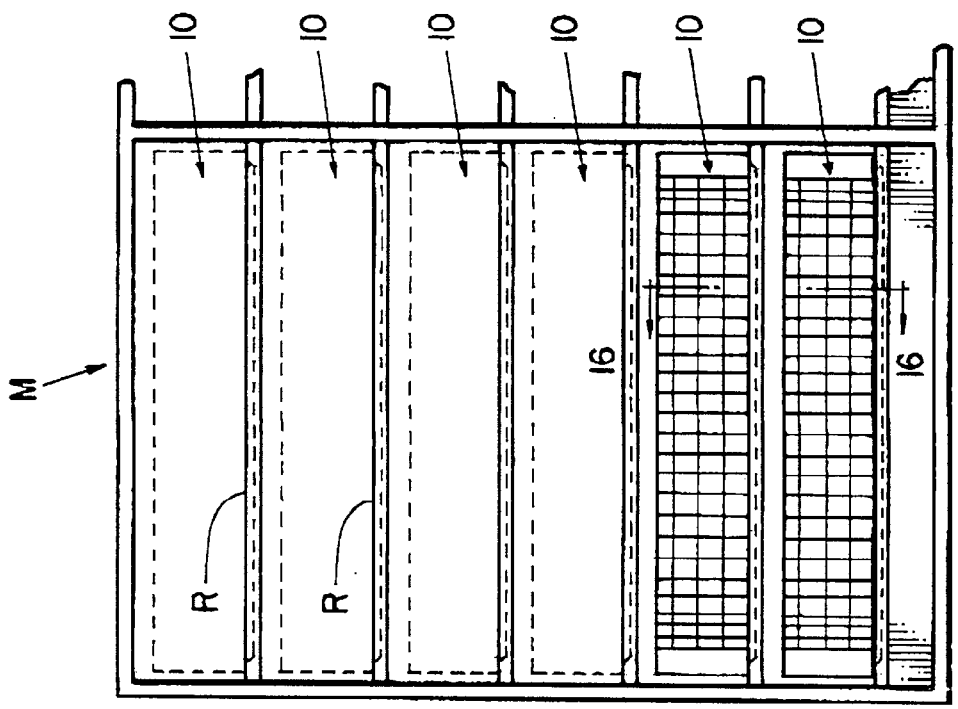
FIG. 15 is a schematic elevational view of the modules mounted on a vehicle for carrying the drawers.

Along the lower extremities of the side walls 14, two downwardly facing bearing strips 54 are provided, extending from end to end of the drawer. The strips 54 are essentially planar along their length and define slide bearing surfaces, along which the drawer 10 may be slid along the appropriate spaced apart rack rails (FIG. 15) for supporting the drawers. Upright side strips 55 at right angles to strips 54 engage the sides of the rails.

Referring now to FIGS. 11 and 12, the corners between the side walls 14 and the end walls 16 are of particular importance. The corners are formed by generally semi-cylindrical outer corner walls 56 and semi-cylindrical inner corner walls 58, which are formed in radially spaced apart relation, and extend in arcs around each of the corners between the side walls and end walls. The inner and outer walls are formed integrally with ends of the horizontal ribs 32 and 40 of the side and end walls, and the end most vertical ribs 30 and 38 of the side walls and the end walls. The outer corner walls 56 and inner walls 58 extend from top to bottom of the end and side walls. They provide a double walled radiused corner formation which permits the easy entry of the drawer into its respective module M on a truck bed. At the same time, the formation of the corners by means of radially spaced apart inner and outer arcuate corner walls provides great strength and integrity at the corners where it is particularly required in this type of product.

Figure 14:
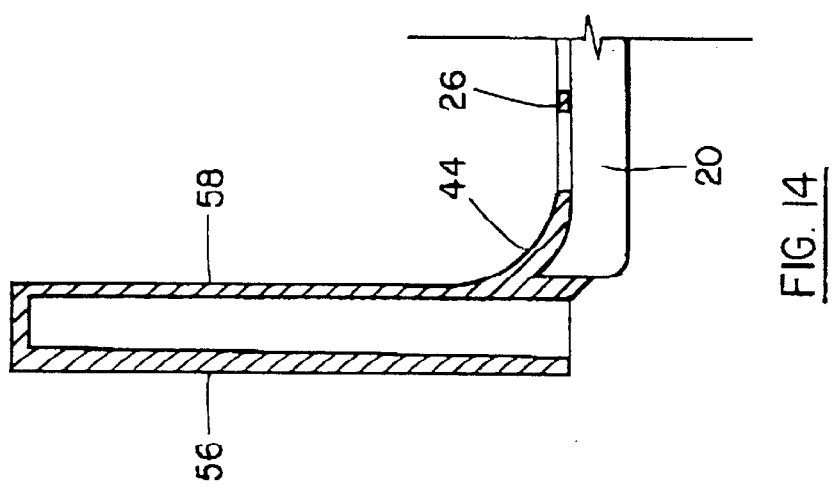
FIG. 14 is a section along line 14—14 of FIGS. 11, 12 and 13.
Figure 16:
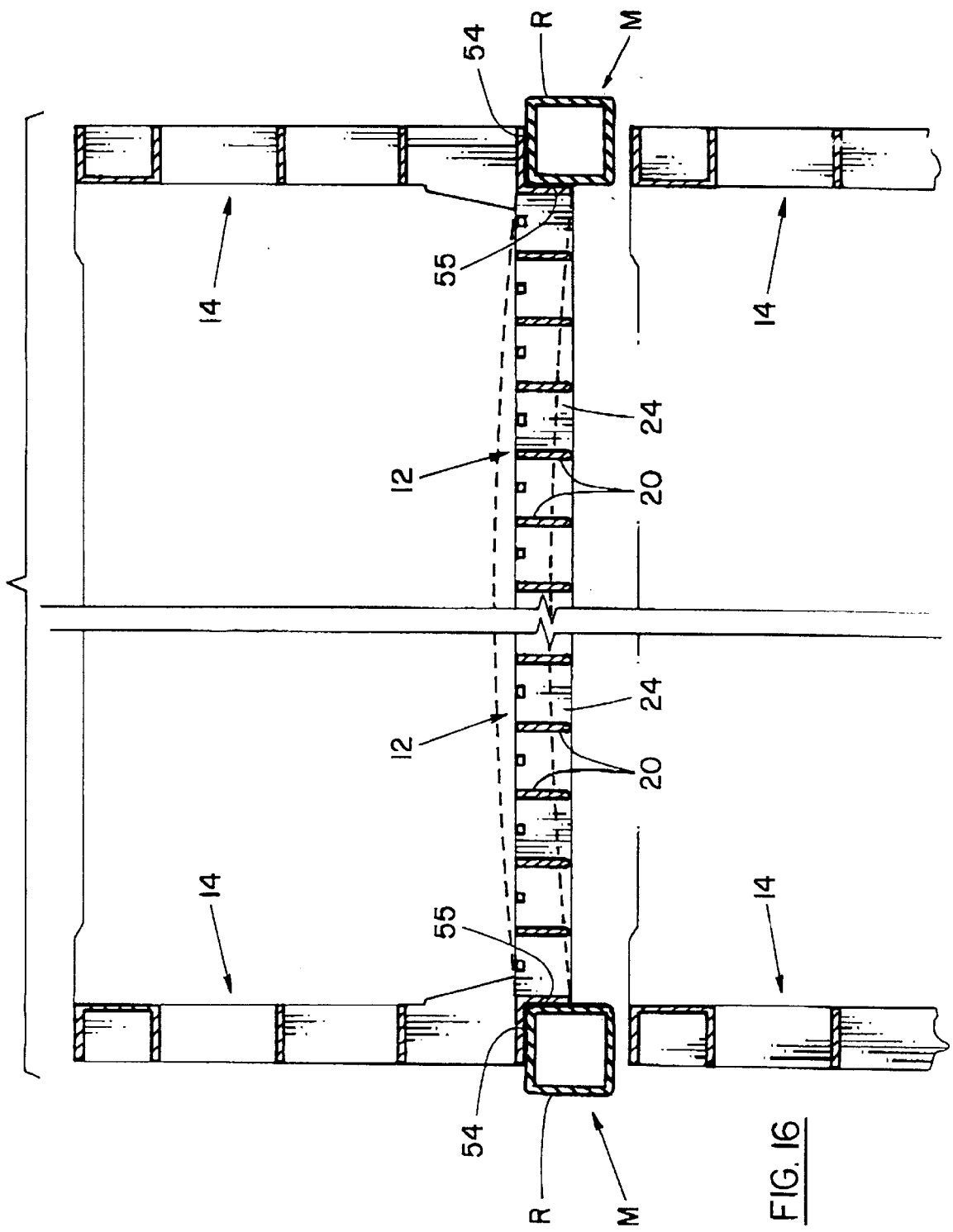
FIG. 16 is an enlarged sectional view showing a drawer supported on such a module.

The angled surfaces 22 at the ends of the lengthwise ribs 20 provide for an easy transition of the lengthwise ribs over the edge of a transverse bar (FIG. 14) which is usually provided in this type of rack which supports the drawers on a truck bed. At the same time, these angled surfaces permit the lengthwise ribs 20 to drop down into a rectangular spaces defined by the racks which thereby securely holds the drawers in position during transport.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. An integral one piece injection moulded drawer suitable for carrying live poultry on a vehicle, the drawer comprising;

side walls and end walls, formed integrally together and meeting at corners, and a floor formed integrally with the side walls and end walls;

intersecting lengthwise and transverse ribs extending downwardly from said floor and extending from end to end and side to side of said drawer and defining generally rectangular spaces there between;

a plurality of intersecting cross bars located within said rectangular spaces, defining together with said lengthwise and transverse ribs an integral generally honeycomb floor structure having an upper surface; a shallow upwardly extending dome-shaped convex profile defined by said floor surface, extending upwardly between said side and end walls;

intersecting side wall and end wall ribs defining generally rectangular spaces there between; and generally rounded corner formations between said side walls and end walls.

2. An integral one piece injection moulded drawer as claimed in claim 1 wherein the corners are formed of inner and outer radiused corner walls, the outer walls extending from the outermost periphery of the side wall and end wall ribs, and the inner corner walls extending integrally from the inner most edges of the side wall and end wall ribs.

3. An integral one piece injection moulded drawer as claimed in claim 1 wherein said ribs in the side walls are joined at spaced intervals to the transverse ribs in the floor by means of generally concave curved junction walls formed integrally therewith.

4. An integral one piece injection moulded drawer as claimed in claim 1 wherein said lengthwise ribs in said floor are merged into integrally formed, generally curved junction walls, extending between said floor and said end walls.

5. An integral one piece injection moulded drawer as claimed in claim 1 wherein said side walls and end walls define upper extremities provided with generally continuous side and end wall top flanges, located in a generally horizontal plane, and including interior side and end wall reinforcement flanges, extending downwardly from said top flanges.

6. An integral one piece injection moulded drawer as claimed in claim 5 wherein said end wall top flanges terminate at a level below said side wall top flanges thereby to define respective end wall notches at either end of said drawer.

* * * * *